(12) United States Patent
Suzuki et al.

(10) Patent No.: US 6,205,178 B1
(45) Date of Patent: Mar. 20, 2001

(54) METHOD AND SYNTHESIZING A PREDICTED IMAGE, VIDEO CODING DEVICE AND VIDEO CODING METHOD

(75) Inventors: Yoshinori Suzuki, Urawa; Yuichiro Nakaya, Tokyo, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/934,062

(22) Filed: Sep. 19, 1997

(30) Foreign Application Priority Data

Sep. 20, 1996 (JP) .................................................. 8-249602

(51) Int. Cl.[7] .................................................. H04N 7/18
(52) U.S. Cl. ................. 375/240.15; 375/240.17; 375/240.16
(58) Field of Search ................. 348/411, 412, 348/413, 699, 416, 700, 702, 409; 375/240.15–240.19

(56) References Cited

U.S. PATENT DOCUMENTS

| | | | |
|---|---|---|---|
| 5,235,419 | * 8/1993 | Krause | 348/416 |
| 5,412,435 | * 5/1995 | Nakajima | 348/699 |
| 5,510,834 | * 4/1996 | Weiss et al. | 348/97 |
| 5,515,388 | * 5/1996 | Yagasaki | 714/800 |
| 5,579,054 | * 11/1996 | Sezan et al. | 348/452 |
| 5,682,205 | * 10/1997 | Sezan et al. | 348/452 |
| 5,754,240 | * 5/1998 | Wilson | 348/416 |
| 5,784,115 | * 7/1998 | Bozdagi | 348/452 |
| 5,883,976 | * 3/1999 | Ohsawa | 382/232 |

OTHER PUBLICATIONS

JP-A-8-140098 (only abstract).

* cited by examiner

*Primary Examiner*—Andy Rao
(74) *Attorney, Agent, or Firm*—Antonelli, Terry, Stout & Kraus, LLP

(57) ABSTRACT

Two arbitrary kinds of block images selected from the LMC block image, GMC block image and G-LMC block image, which are respectively synthesized by the local motion compensation, global motion compensation and global-local motion compensation, are averaged to produce an average block image, any one block image is selected from those LMC block image, GMC block image, G-LMC block image and average block image, and a prediction error signal is produced from the difference between this selected block image and the image within a block of the original image. Therefore, the coding characteristics can be improved.

6 Claims, 7 Drawing Sheets

ORIGINAL IMAGE OF CURRENT FRAME

REFERENCE IMAGE

GRID POINT OF ORIGINAL IMAGE OF CURRENT FRAME

GRID POINT OF REFERENCE IMAGE AFTER MOTION ESTIMATION

FIG.7A

FRAME DATA (FOR INTERFRAME CODING)

| FRAME HEADER INFORMATION | FRAME TYPE INFORMATION | GLOBAL MOTION VECTOR | BLOCK DATA (FIG.7B) | ..... | BLOCK DATA (FIG.7B) | END CODE |
|---|---|---|---|---|---|---|

FIG.7B (a)

| BLOCK TYPE INFORMATION | CONTROL INFORMATION FOR QUANTIZATION | QUANTIZED DCT COEFFICIENT |
|---|---|---|

(b)

| BLOCK TYPE INFORMATION | CONTROL INFORMATION FOR QUANTIZATION | LOCAL MOTION VECTOR | GLOBAL-LOCAL MOTION VECTOR | QUANTIZED DCT COEFFICIENT |
|---|---|---|---|---|

(c)

| BLOCK TYPE INFORMATION | CONTROL INFORMATION FOR QUANTIZATION | LOCAL MOTION VECTOR | QUANTIZED DCT COEFFICIENT |
|---|---|---|---|

(d)

| BLOCK TYPE INFORMATION | CONTROL INFORMATION FOR QUANTIZATION | GLOBAL-LOCAL MOTION VECTOR | QUANTIZED DCT COEFFICIENT |
|---|---|---|---|

METHOD AND SYNTHESIZING A PREDICTED IMAGE, VIDEO CODING DEVICE AND VIDEO CODING METHOD

BACKGROUND OF THE INVENTION

This invention relates to the digital video coding technology.

It is known that the motion compensation utilizing the correlation between the frames adjacent from time point of view produces a great compression effect on the high-efficiency coding of digital videos. Therefore, the international standard H.261, H.263, MPEG1, and MPEG2 for the present video coding adopt the motion compensation called the block matching in which the video image to be coded is divided into a plurality of square blocks and a motion vector is detected for each block. An algorithm for these international standard systems is described in, for example, "The Latest MPEG Textbook" supervised by Hiroshi Fujihara, August, 1994.

FIG. 1 shows the general concept of the block matching. Referring to FIG. 1, reference numeral 101 represents the original image of a frame (current frame) being coded, and 102 the decoded image (reference image) of the already-coded frame near the current frame with respect to time.

In the block matching, the original image 101 is divided into a plurality of blocks $G_{i,j}$ (i and j indicate the horizontal block number and the vertical block number, respectively). The normally used block size is formed of 16 vertical pixels and 16 horizontal pixels. Then, motion estimation is performed for each block between the original image 101 and the reference image 102. The motion estimation is made in the block matching as follows. The block $P_{i,j}$ (0,0) at the position corresponding to that of the block $G_{i,j}$ is moved in parallel by any amount and in all directions on the reference image 102, and a motion vector is detected which shows the parallel movement providing the minimum difference between the image within the block $G_{i,j}$ on the original image 101 and the image within the a block after the movement on the reference image 102. In FIG. 1, 103 represents one of the divided blocks, and the motion vector of this block 103 is detected. This block 103 is represented by $G_{i,j}$. The block, 104 indicated by $P_{i,j}(u,v)$ is the block that is specified by the above motion estimation and that provides the minimum difference as described above. The block $P_{i,j}(u,v)$ results from the parallel movement of the block $P_{i,j}$ (0,0), which is at the position corresponding to that of the block $G_{i,j}$, by u pixels in the horizontal direction and by v pixels in the vertical direction. In addition, an arrow 105 indicates a motion vector $MV_{i,j}(u,v)$ detected by the motion estimation relative to the block $G_{i,j}$. In the block matching, the above motion estimation is performed for all divided blocks $G_{i,j}$ on the original image 101, and the motion vector $MV_{i,j}(u,v)$ is detected for each block $G_{i,j}$.

Moreover, each block $P_{i,j}(0,0)$ on the reference image 102 at the position corresponding to that of each block $G_{i,j}$ on the original image 101 is moved on the basis of each detected motion vector $MV_{i,j}(u,v)$ for each block $G_{i,j}$, and the images within the blocks $P_{i,j}$ after movement are collected at the positions before the movement to synthesize a predicted image 106.

Thus, the original image is divided into a plurality of blocks, motion estimation is performed for each of the divided blocks between the original image and the reference image, detecting each motion vector, and the predicted image is synthesized from the detected motion vectors of the respective blocks and the reference image. This motion compensation is called the local motion compensation (LMC). The predicted image synthesized by the local motion compensation is termed the predicted image of LMC.

The above-mentioned block matching is a kind of the local motion compensation, and is a special case in which only the parallel movement of blocks are considered in the motion estimation. The local motion compensation is not limited to the block matching, but includes the motion compensation which takes account of the combination of the parallel movement of blocks and the deformation of blocks in the motion estimation. Since the block matching takes only the parallel movement into account, the motion vector detected by the motion estimation is only one for each block. However, since the latter motion compensation considers the combination of the parallel movement and the deformation, the motion vector detected by the motion estimation includes a plurality of vectors for each block. The image within the block after movement/deformation in the local motion compensation is referred to as the LMC block image.

The above-mentioned local motion compensation is the motion compensation for detecting the local movement within the image. On the other hand, it is reported that the image sequence involving the pan of camera and zoom operation as in the sportscast can be effectively processed by the global motion compensation for the whole image (for example, see "Global Motion Compensation in Video Coding" written by Kamikura and others, The Journal of The Institute of Electronics, Information and Communication Engineers of Japan, Vol. J76-B-1, No. 12, pp 944–952, December, 1993). This motion compensation is called the global motion compensation (GMC).

FIG. 2 shows an example of the global motion compensation. Referring to FIG. 2, there are shown an original image 201 of current frame, a reference image 202 for the original image 201, a patch 203 in the case where the whole original image 201 is regarded as one region, and grid points 204, 205, 206, 207 of the patch. In the global motion compensation, motion estimation is carried out over the whole image between the original image 201 and the reference image 202. When motion estimation is made in the global motion compensation, the patch 203 is moved in parallel or deformed at will on the reference image 202 or the patch 203 is both moved in parallel and deformed, and the motion vector indicating the movement/deformation is detected in order to provide the minimum difference, in the image within the patch after the movement/deformation, between the original image 201 and the reference image 202. In FIG. 2, reference numeral 208 represents the patch after the movement/deformation providing the minimum difference. At this time, the grid points 204, 205, 206 and 207 are moved to the points 209, 210, 211 and 212, respectively, and four motion vectors can be obtained as the motion vectors to the patch 203 as illustrated in FIG. 2 by the arrows, which are associated with the grid points 204 to 207.

In addition, the patch 203 is moved/deformed by moving the grid points 204 to 207 of the patch 203 on the basis of the detected motion vectors, so that the image within the patch 208 after the movement/deformation on the reference image 202 is synthesized as a predicted image.

The predicted image synthesized by the above-mentioned global motion compensation is termed the predicted image of GMC. The method of synthesizing this predicted image of GMC can also be a high-speed algorithm which is disclosed in "Japanese Patent Application No. 8-60572 filed on Mar. 18, 1996" (the equivalent filed as application Ser. No. 08/819,628, on Mar. 17, 1997, now U.S. Pat. No. 6,008, 852).

The methods of synthesizing the predicted image in the local motion compensation and global motion compensation are well known, and here the supplementary explanation will be made on the methods. As the above block or patch is moved/deformed on the basis of the motion vector or vectors detected by the motion estimation, the pixels within the block or patch before the movement/deformation are transformed in their positions. Therefore, it is necessary to calculate the positions of the pixels within the block or patch after the movement/deformation. Here, the positions of the pixels after the movement will be estimated by bilinear transform as an example of the methods. The bilinear transform can be applied not only to the parallel movement in the motion compensation but also to the rotation and deformation. When the position of the original pixel is represented by coordinates (x, y), the position of the pixel after movement, (tx (x, y), ty (x, y)), can be expressed by the following equation.

$$tx(x, y) = b_1 xy + b_2 x + b_3 y + b_4$$
$$ty(x, y) = b_5 xy + b_6 x + b_7 y + b_8 \quad (1)$$

In Eq. (1), parameters $b_1$ to $b_8$ can be definitely specified from the four motion vectors to the grid points detected by the motion estimation. In the block matching, since only the parallel movement of blocks are considered in the motion estimation, the parameters $b_1$, $b_3$, $b_5$, $b_6$ in Eq. (1) are 0, and the parameters $b_2$ and $b_7$ are 1. The parameters $b_4$ and $b_8$ can be definitely specified from one motion vector to the block detected by the motion estimation for each block.

After computing the positions of the pixels within the block or patch after the movement/deformation, the pixel values at the calculated positions are specified by use of the pixels on the reference image to obtain the LMC block image or predicted image of GMC. Depending upon the positions of the pixels after the movement, there is sometimes not a pixel on the reference image. In that case, the pixel value is calculated by use of the pixels around the computed position of the pixel.

The above-mentioned global motion compensation is effective when all pixels of the image perform the same motion in a united motion model, but if there is any region which performs a different motion within the image from the motion of the other regions, the global motion compensation can be applied to only one pattern movement of the regions. Therefore, a motion compensation called the global-local motion compensation (G-LMC) is proposed in the prior art. In the global-local motion compensation, the predicted image of GMC is first synthesized by the above global motion compensation. Then, the reference image 102 shown in FIG. 1 is used as the synthesized predicted image of GMC, and local motion compensation is performed between the original image and the predicted image of GMC to synthesize a predicted image. The predicted image synthesized by the global-local motion compensation is referred to as the predicted image of G-LMC. Also, the image within the block after the movement/deformation in the global-local motion compensation is called the G-LMC block image.

On the coding side, the original image of current frame and the above-mentioned predicted image synthesized by each motion compensation are each divided into a plurality of blocks, and the difference between the image within the block of the original image and that within the block of the predicted image is calculated for each block to provide a prediction error signal. This prediction error signal is subjected to the DCT, quantized and then transmitted. In the above local motion compensation or global-local motion compensation, the image is generally divided into blocks of the same size as that of the blocks divided in the case of the motion estimation, and the prediction error signal is produced from between the image within the block of the original image and the LMC block image or between the image within the block of the original image and the G-LMC block image. The image within each block of the predicted image of GMC divided into blocks is called the GMC block image.

In addition to the coding using the global-local motion compensation, another coding is known which is disclosed in JP-A-8-140098. In this coding method, the local motion compensation and global motion compensation are performed between the original image and the reference image to synthesize the predicted image of LMC and the predicted image of GMC. When the prediction error signal is produced for each block of the divided original image, any one of the LMC block image and the GMC block image is suitably selected and used.

When a kind of block image (the LMC block image or GMC block image) is selected for each block from the two kinds of predicted images synthesized by the local motion compensation and global motion compensation, the nonselected block images are not used at all to produce the prediction error signal, and thus there is the problem that the arithmetic processing for those block images becomes useless.

SUMMARY OF THE INVENTION

According to the present invention, a kind of block image is selected for each block from three kinds of blocks which include two kinds of block images (the LMC block image, and GMC block image) synthesized by the local motion compensation and global motion compensation, and one kind of the average block image resulting from averaging both block images, thereby increasing the coding efficiency and making the arithmetic processing which became useless as above be used as little as possible.

In addition, according to the invention, a kind of block image is selected for each block from three kinds of blocks which include two kinds of block images (the LMC block image and G-LMC block image) synthesized by the local motion compensation and global-local motion compensation, and the average block image resulting from averaging both block images, thereby increasing the coding efficiency and making the useless arithmetic processing be used as little as possible.

Moreover, according to the invention, a kind of block image is selected for each block from three kinds of blocks which include two kinds of block images (the LMC block image and G-LMC block image) synthesized by the local motion compensation and global-local motion compensation, and the average block image resulting from averaging the LMC block image and GMC block image, thereby increasing the coding efficiency and making the useless arithmetic processing be used as little as possible.

The foregoing and other objects, advantages, manner of operation and novel features of the present invention will be understood from the following detailed description when read in connection with the accompanying drawings.

BRIEF DESCRIPTION OF THE DRAWINGS

FIG. 7A is a diagram showing the format of frame data.

FIG. 7B is a diagram showing the format of block data.

DESCRIPTION OF THE PREFERRED EMBODIMENTS

The above-mentioned three kinds of motion compensation predicted images (the predicted image of LMC, predicted image of GMC, and predicted image of G-LMC) are effectively used, and the prediction error signal can be produced by some kinds of the final predicted image synthesizing methods. Here, three kinds of methods will be described.

In the first method, a block image for use in producing the prediction error signal for each block is produced by using the LMC block image, the GMC block image and the average block image resulting from averaging the LMC block image and the GMC block image.

Figure 1:
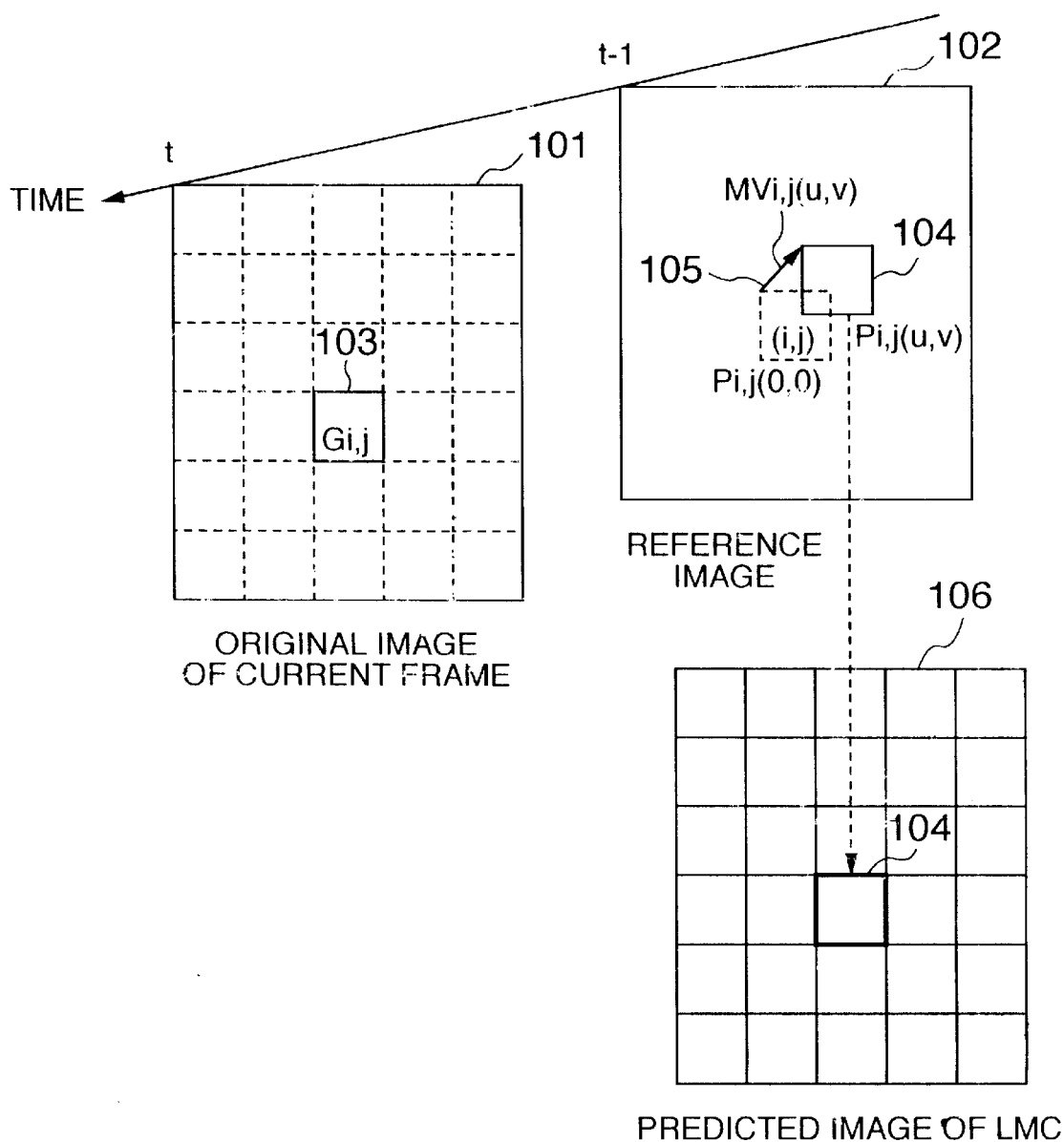
FIG. 1 is a diagram showing the principle of the block matching.
Figure 2:
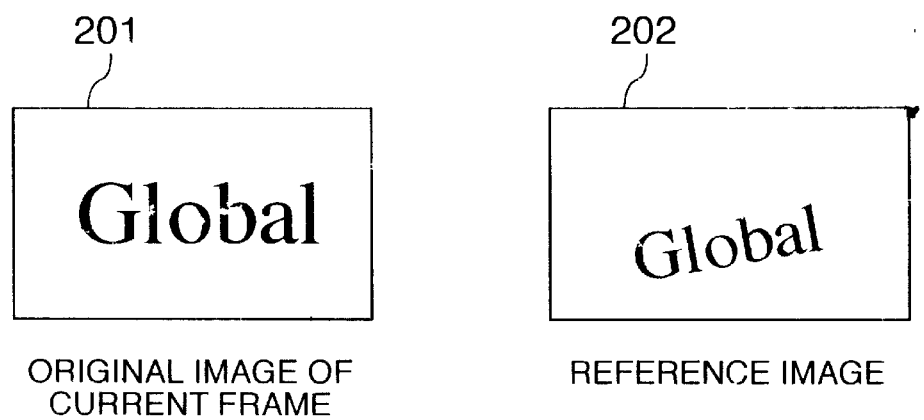
FIG. 2 is a diagram showing the principle of the global motion compensation.
Figure 2:
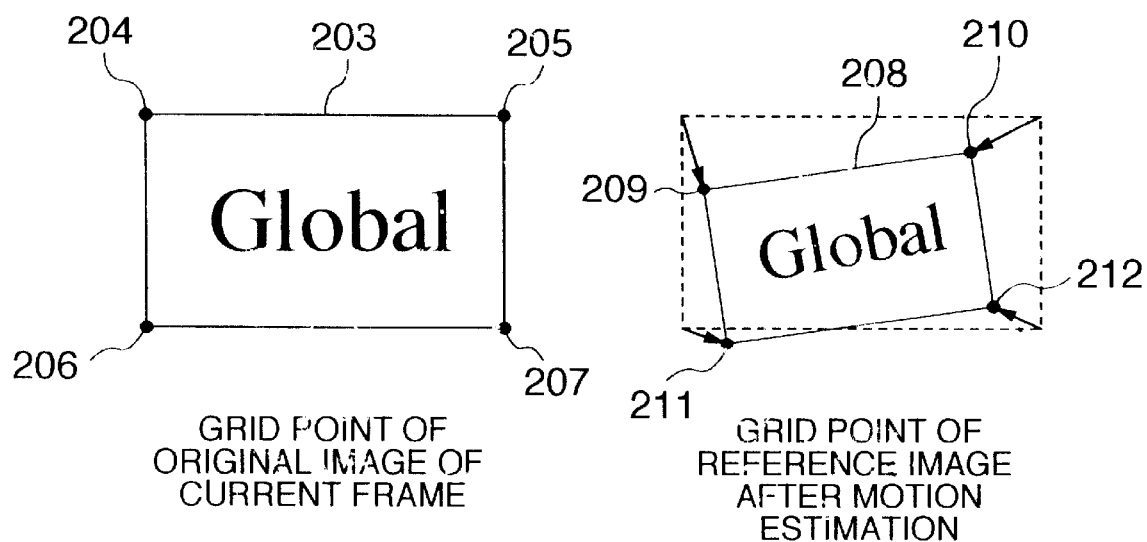
Figure 3:
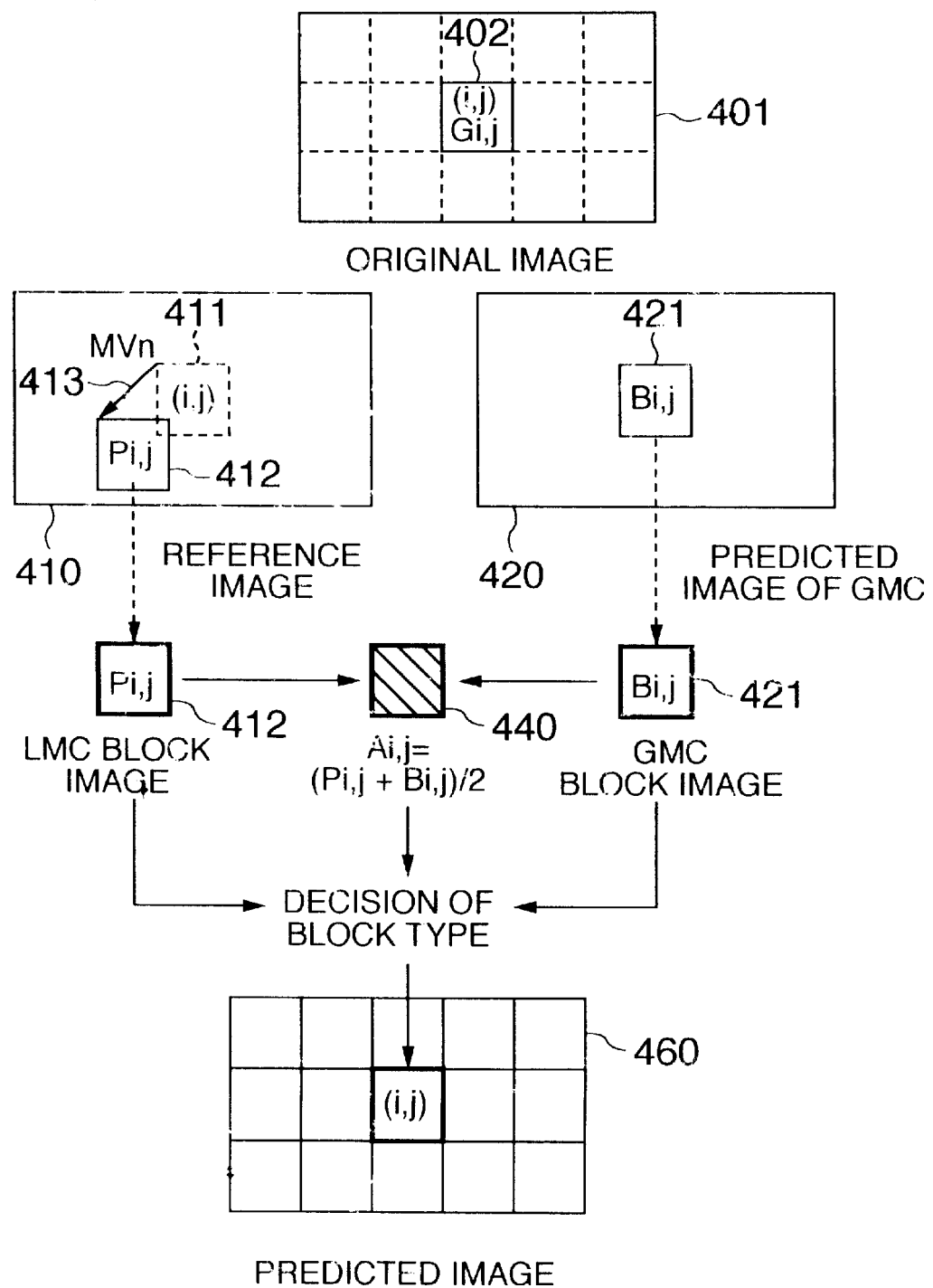
FIG. 3 is a diagram showing a procedure for synthesizing the predicted image.

FIG. 3 shows the procedure for synthesizing the predicted image in which coding of prediction error signals is made. Reference numeral 401 shows the square blocks (the general block size is formed of 16 vertical pixels and 16 horizontal pixels) into which the original image of current frame is divided. Here, let us notice one block 402 of the blocks. In FIG. 3, i and j represent the position of the block within the original image 401, $G_{i,j}$ the block 402, and 410 the reference image as the decoded image of an already coded frame near the current frame with respect to time. In addition, reference numeral 411 on the reference image 410 denotes the block at the same spatial position as that of the block 402 on the original image 401.

First, local motion compensation is performed between the original image 401 and the reference image 410, and the LMC block image 412 is produced relative to the block 402 on the original image 401. In FIG. 3, 413 designates the motion vector MVn relative to the block 402 detected by the motion estimation of the local motion compensation.

At the same time, the global motion compensation is carried out between the original image 401 and the reference image 410, the predicted image of GMC 420 is synthesized, and the image within the block at the same spatial position as that of the block 402 on the original image 401 is produced as the GMC block image 421 on the synthesized predicted image of GMC 420.

Then, the pixels at the positions corresponding to those of the LMC block image 412 and the GMC block image 421 are averaged to produce an average block image 440. This averaging process can be expressed by the following equation.

$$A_{i,j}(n)=(P_{i,j}(n)+B_{i,j}(n))/2 \qquad (2)$$

where n is the number of the pixel within each block image, $P_{i,j}(n)$ is the pixel within the LMC block image $P_{i,j}(n)$, and $B_{i,j}(n)$ is the pixel within the GMC block image $B_{i,j}$ at the same spatial position as that of $P_{i,j}(n)$. In addition, $A_{i,j}(n)$ is the average between $P_{i,j}(n)$ and $B_{i,j}(n)$, indicating the pixel within the average block image 440. In Eq. (2), n is an integer of 0 through 255 if the block is assumed to be formed of 16 vertical pixels and 16 horizontal pixels. Also, while in Eq. (2) rounding by truncation is used, rounding to the nearest integer can be used in this technology.

Finally, a block image suitable for the most-efficient coding is selected from these three block images (the LMC block image 412, GMC block image 421 and average block image 440).

The above-mentioned processing is also performed for the other blocks except the block 402 on the original image 401, the block images selected for each block on the original image 401 are collected, and a predicted image 460 is synthesized which will be used for the coding of prediction error signals to the original image 401. Then, the prediction error signals are produced from between each block on the original image 401 and the block image at the corresponding position on the predicted image 460, subjected to the DCT, quantized, and transmitted to the decoder side. The motion vector (hereinafter, referred to as global motion vector) to the patch detected by the motion estimation of the global motion compensation is transmitted for each frame to the decoder side. Moreover, the motion vector (hereinafter, called the local motion vector) to the block detected by the motion estimation of the local motion compensation is transmitted together with the prediction error signal to the decoder side when the LMC block image or the average block image is selected from the three block images. When the GMC block image is selected from the three block images, the motion vector to the block is not transmitted.

In the second method, a block image for use in producing the prediction error signal for each block is produced by using the LMC block image, G-LMC block image and the average block image resulting from averaging the LMC block image and G-LMC block image.

Figure 4:
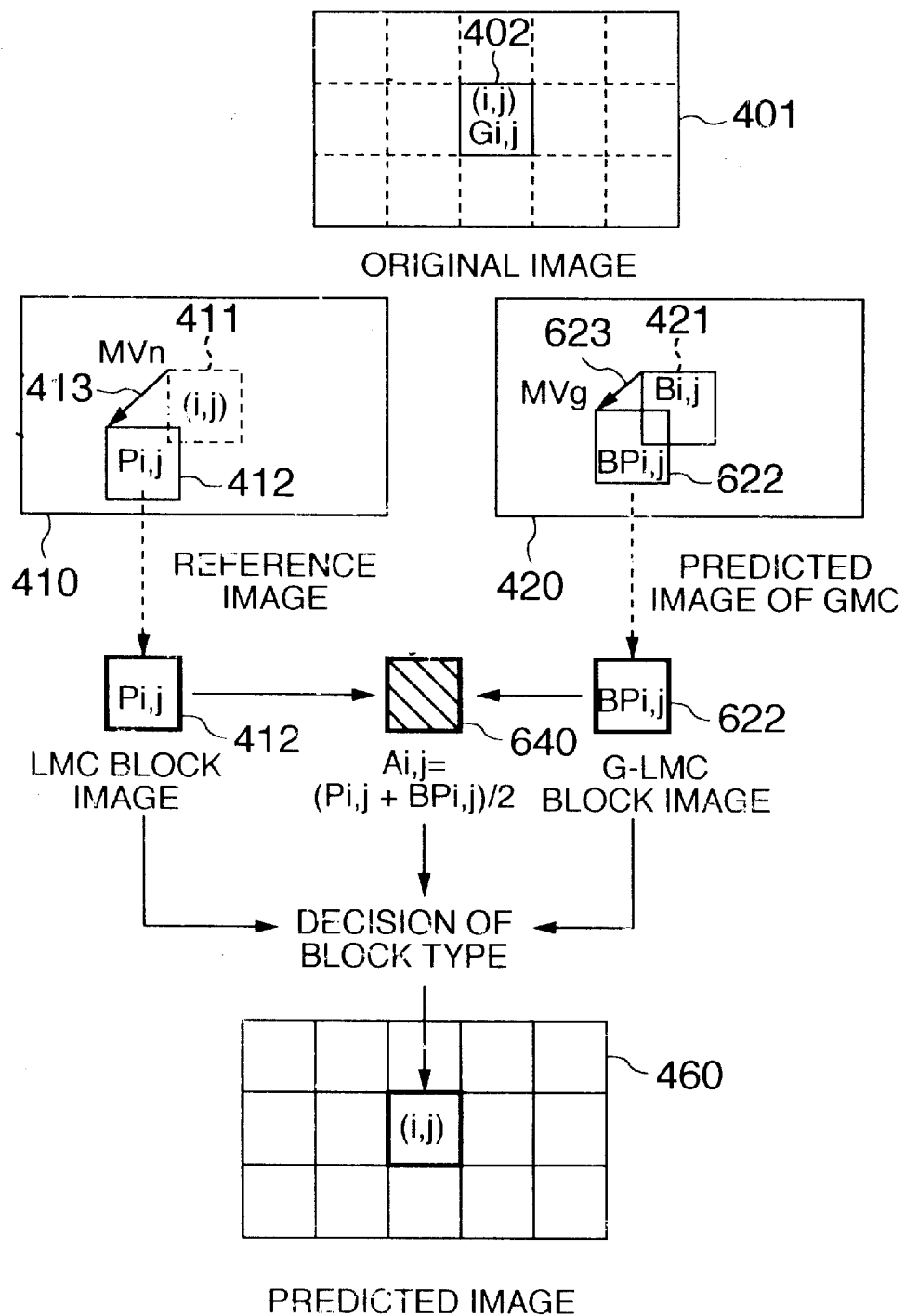
FIG. 4 is a diagram showing another procedure for synthesizing the predicted image.

FIG. 4 shows the procedure for synthesizing the predicted image for the coding of prediction error signals according to this method. Referring to FIG. 4, reference numeral 401 represents the square blocks (the general block size is formed of 16 vertical pixels and 16 horizontal pixels) into which the original image of current frame is divided. Here, let us notice one block 402 of the blocks. In FIG. 4, i and j designate the position of the block within the original image 401, $G_{i,j}$ the block 402, and reference numeral 410 the reference image as a decoded image of the already coded frame near the current frame with respect to time. In addition, reference numeral 411 on the reference image 410 represents the block on the reference image 410 at the same spatial position as that of the block 402 on the original image 401.

First, local motion compensation is performed between the original image 401 and the reference image 410, and the LMC block image 412 is produced relative to the block 402 on the original image 401. In FIG. 4, reference numeral 413 indicates the motion vector MVn relative to the block 402 detected by the motion estimation of the local motion compensation.

At the same time, global-local motion compensation is carried out between the original image 401 and the reference image 410, and the G-LMC block image 622 relative to the block 402 on the original image 401 is produced. More specifically, at the first stage, the global motion compensation is performed between the original image 401 and the reference image 410, synthesizing the predicted image of GMC 420. Then, at the second stage, the local motion compensation is performed between the original image 401 and the synthesized predicted image of GMC 420, producing the G-LMC block image 622 relative to the block 402 on the original image 401. In FIG. 4, reference numeral 623 represents the motion vector MVg relative to the block 402 detected by the motion estimation of the local motion compensation at the second stage in the global-local motion compensation.

Then, the average block image, 640 is synthesized by averaging the pixels of the LMC block image 412 and the G-LMC block image 622 at the corresponding positions. This averaging process can be expressed by the following equation.

$$A_{i,j}(n)=(P_{i,j}(n)+BP_{i,j}(n))/2 \tag{3}$$

where n is the number of the pixel within each block image, $P_{i,j}(n)$ is the pixel within the LMC block image $P_{i,j}$, $BP_{i,j}(n)$ is the pixel at the same spatial position as that of $P_{i,j}(n)$ within the G-LMC block image $B_{i,j}$, and $A_{i,j}(n)$ is the average between $P_{i,j}(n)$ and $BP_{i,j}(n)$, or the pixel within the average block image 640. In Eq. (3), n is an integer of 0 through 255 if the block is assumed to be formed of 16 vertical pixels and 16 horizontal pixels. In addition, while in Eq. (3) rounding by truncation is used, rounding to the nearest integer can be used in this technology.

Finally, a block image suitable for the most-efficient coding is selected from these three block images (the LMC block image 412, G-LMC block image 622 and average block image 640).

The above-mentioned processing is also performed for the other blocks except the block 402 on the original image 401, the block images selected for each block on the original image 401 are collected, and the predicted image 460 is synthesized which will be used for the coding of prediction error signals to the original image 401. Then, the prediction error signals are produced from between each block on the original image 401 and the block image at the corresponding position on the predicted image 460, subjected to the DCT, quantized, and transmitted to the decoder side. The motion vector (hereinafter, referred to as global motion vector) to the patch detected by the motion estimation of the global motion compensation is transmitted for each frame to the decoder side. Moreover, the motion vector (hereinafter, called the local motion vector) to the block detected by the motion estimation of the local motion compensation is transmitted together with the prediction error signal to the decoder side when the LMC block image or the average block image is selected from the three block images. Moreover, the motion vector (hereinafter, referred to as the global-local motion vector) detected by the motion estimation of the local motion compensation at the second stage in the global-local motion compensation is transmitted together with the prediction error signal when the G-LMC block image or the average block image is selected from the three block images. In other words, when the average block image is selected from the three block images, the two motion vectors (the local motion vector and global-local motion vector) are transmitted together with the prediction error signal for each block.

In the third method, a block image for use in producing the prediction error signal for each block is produced by using the LMC block image, G-LMC block image and the average block image resulting from averaging the LMC block image and GMC block image.

Figure 5:
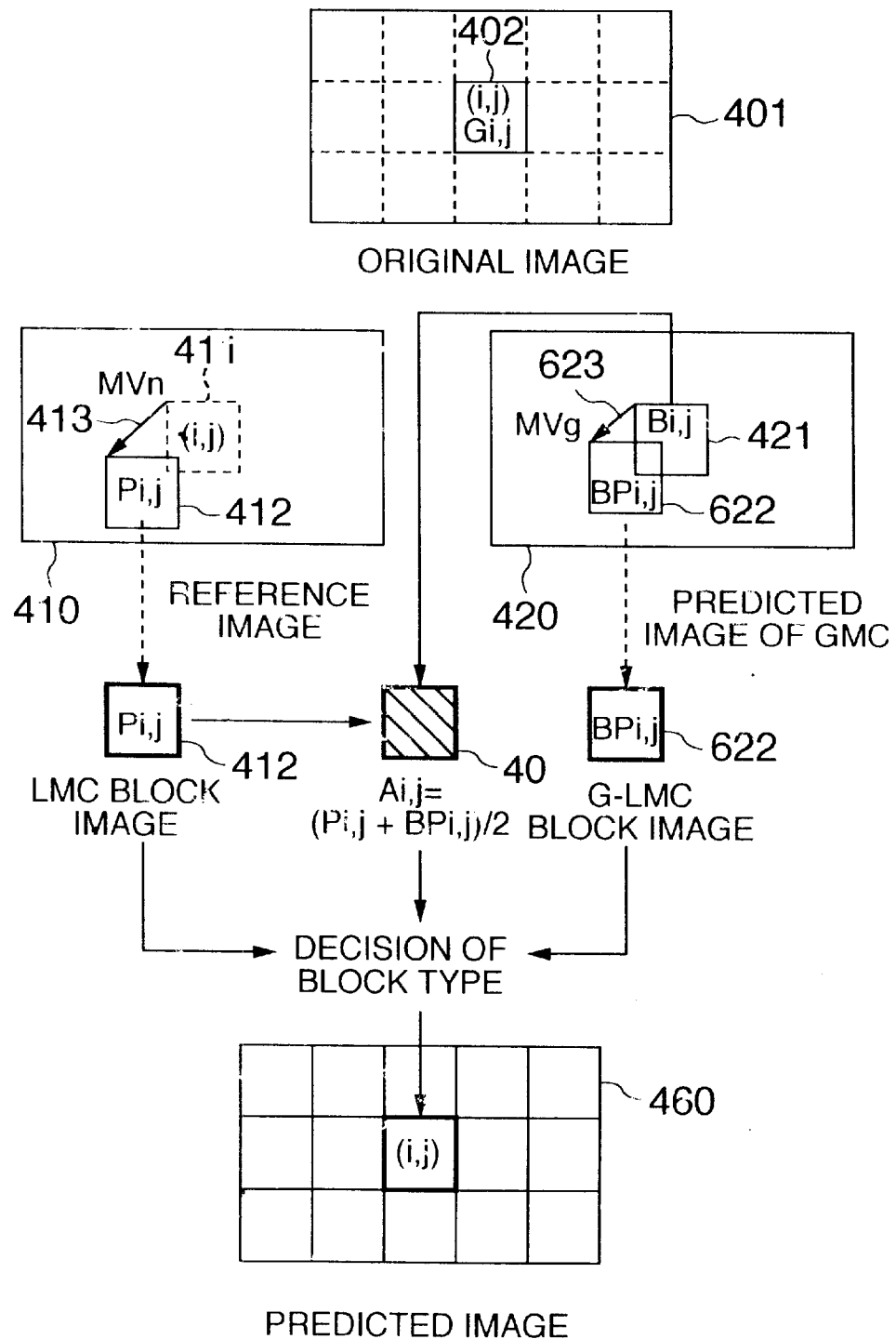
FIG. 5 is a diagram showing still another procedure for synthesizing the predicted image.

FIG. 5 shows the procedure for synthesizing the predicted image for the coding of prediction error signals according to this method. Referring to FIG. 5, reference numeral 401 represents the square blocks (the general block size is formed of 16 vertical pixels and 16 horizontal pixels) into which the original image of current frame is divided. Here, let us notice one block 402 of the blocks. In FIG. 5, i and j designate the position of the block within the original image 401, $G_{i,j}$ the block 402, and reference numeral 410 the reference image as a decoded image of the already coded frame near the current frame with respect to time. In addition, reference numeral 411 on the reference image 410 represents the block on the reference image 410 at the same spatial position as that of the block 402 on the original image 401.

First, local motion compensation is performed between the original image 401 and the reference image 410, and the LMC block image 412 is produced relative to the block 402 on the original image 401. In FIG. 5, reference numeral 413 indicates the motion vector MVn relative to the block 402 detected by the motion estimation of the local motion compensation.

At the same time, global-local motion compensation is carried out between the original image 401 and the reference image 410, and the GMC block image 421 and the G-LMC block image 622 relative to the block 402 on the original image 401 are produced. More specifically, at the first stage, the global motion compensation is performed between the original image 401 and the reference image 410, synthesizing the predicted image of GMC 420. On the synthesized predicted image of GMC 420, the image within the block at the same spatial position as the block 402 on the original image 401 is produced as the GMC block image 421. Then, at the second stage, the local motion compensation is performed between the original image 401 and the synthesized predicted image of GMC 420, producing the G-LMC block image 622 relative to the block 402 on the original image 401. In FIG. 5, reference numeral 623 represents the motion vector MVg relative to the block 402 detected by the motion estimation of the local motion compensation at the second stage in the global-local motion compensation.

Then, the average block image, 40 is synthesized by averaging the pixels of the LMC block image 412 and the GMC block image 421 at the corresponding positions. This averaging process can be expressed by the same equation as Eq.(1), and hence will not be given.

Finally, a block image suitable for the most-efficient coding is selected from these three block images (the LMC block image 412, GLMC block image 622 and average block image 40).

The above-mentioned processing is also performed for the other blocks except the block 402 on the original image 401, the block images selected for each block on the original image 401 are collected, and the predicted image 460 is synthesized which will be used for the coding of prediction error signals to the original image 401. Then, the prediction error signals are produced from between each block on the original image 401 and the block image at the corresponding position on the predicted image 460, subjected to the DCT, quantized, and transmitted to the decoder side. The motion vector (hereinafter, referred to as global motion vector) to the patch detected by the motion estimation of the global motion compensation at the first stage in the global-local motion compensation is transmitted for each frame to the decoder side. Moreover, the motion vector (hereinafter, called the local motion vector) to the block detected by the motion estimation of the local motion compensation is transmitted together with the prediction error signal to the decoder side when the LMC block image or the average block image is selected from the three block images. Moreover, the motion vector (hereinafter, referred to as the global-local motion vector) detected by the motion estimation of the local motion compensation at the second stage in the global-local motion compensation is transmitted together with the prediction error signal to the decoder side when the G-LMC block image is selected from the three block images. In other words, even when any one is selected from the three block images, one motion vector is transmitted together with the prediction error signal for each block.

In the methods for synthesizing the predicted image mentioned with reference to FIGS. 3, 4 and 5, the criterion for selecting the block image to provide the highest coding efficiency can be considered as (1) to select so that the amount of coding information is less to the generated prediction error signal, or (2) to select so that the total amount of coding information is less to the generated prediction error signal and motion vector. Which one of the criteria (1) and (2) can be decided to be most suitable is dependent upon the method of synthesizing the predicted image. In the method for synthesizing the predicted image shown in FIGS. 3 and 4, since the number of motion vectors for each vector to be transmitted depends upon the selected block image, it is desired that the block image be selected on the basis of the criterion (2) from the standpoint of higher coding efficiency. In the method for synthesizing the predicted image shown in FIG. 5, since the number of motion vectors to each block to be transmitted does not depend upon the selected block image, any one of the criteria (1) and (2) may be selected with substantially no difference. However, from the viewpoint of the amount of arithmetic processing, the criterion (1) should be selected.

In the three methods for synthesizing the predicted image, since noise elimination and low-pass filter effects can be achieved by averaging the block images of different predicted images, the power spectrum of AC component of DCT coefficient to the prediction error signal is decreased, and thus it can be expected to increase the performance of prediction.

Figure 6:
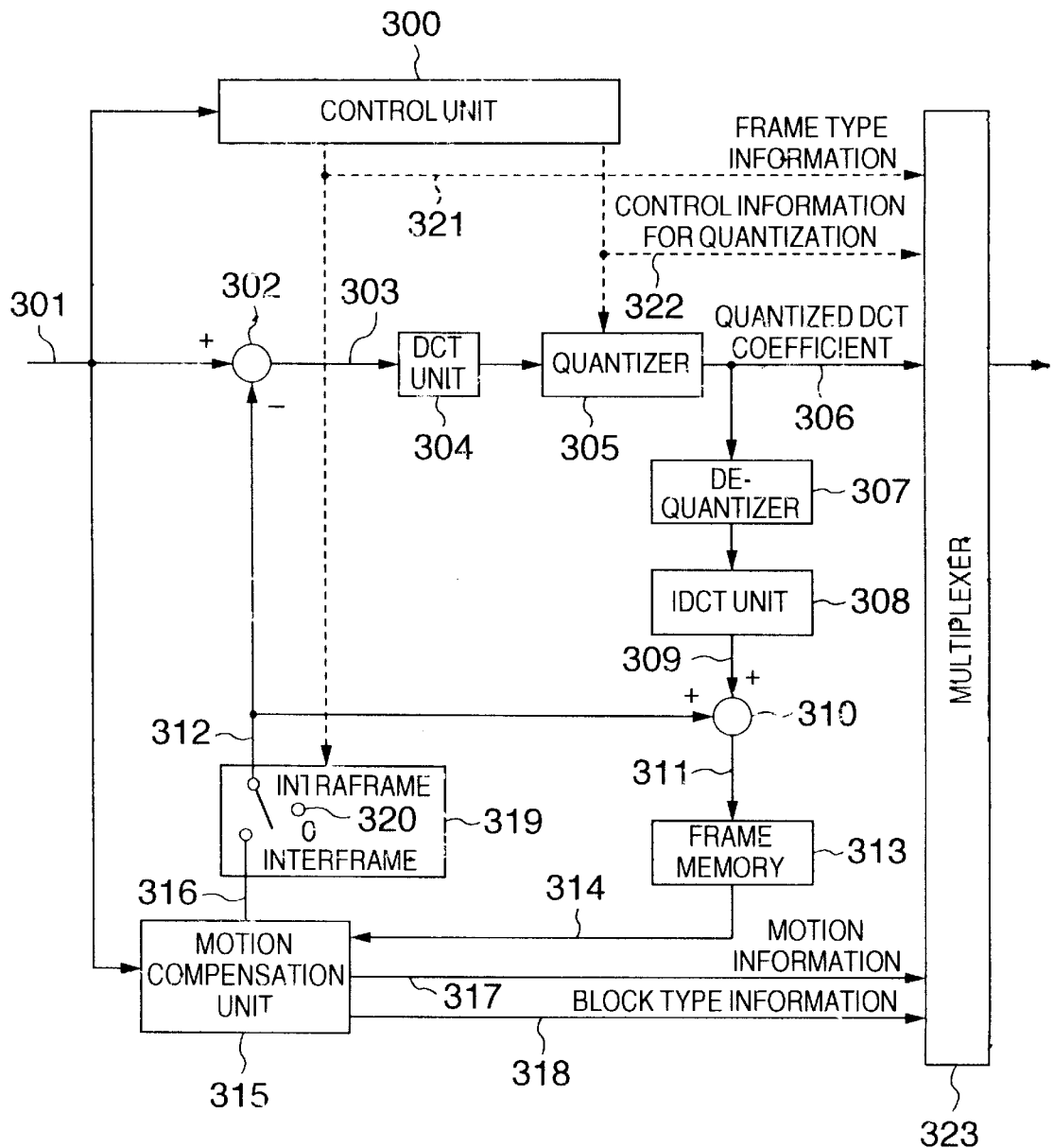
FIG. 6 is a diagram of the encoder to which the invention is applied.

FIG. 6 is a block diagram of the video coding device to which the invention is applied.

In FIG. 6, there are shown a control unit 300, a subtracter 302, a DCT unit 304, a quantizer 305, a dequantizer 307, an IDCT unit 308, an adder 310, a frame memory 313, a motion compensation unit 315, a switch 319, and a multiplexer 323.

This video coding device adopts the interframe/intraframe adaptive coding system in which the interframe coding and intraframe coding are interchanged by the switch 319. The switch 319 is controlled for each frame by the control unit 300. In addition, the frame type information indicating which one of the interframe coding and intraframe coding has been selected for each frame unit is transmitted from the control unit 300 to the multiplexer 323.

The operation in the intraframe coding will be described below.

An original image 301 of current frame and a 0 signal 312 (320) are supplied to the subtracter 302, which then directly produces an original image 303 of current frame for each frame as it is. This original image 303 is fed to the DCT unit 304, where it is transformed into a DCT coefficient. Then, the quantizer 305 quantizes the coefficient and produces a quantized DCT coefficient 306. The quantization parameter used in the quantizer is controlled by the control unit 300, and control information for quantization, 322 is supplied from the control unit 300 to the multiplexer 323. This quantized DCT coefficient 306 is transmitted to the multiplexer 323, where it is multiplexed with frame type information 321 and the control information 322 for quantization.

The operation in the interframe coding will be mentioned as follows.

The motion compensation unit 315 receives the original image 301 of current frame and a reference image 314 relative to the current frame, read out from the frame memory 313, synthesizes a predicted image 316 relative to the current frame according to the predicted image synthesizing method mentioned with reference to FIG. 3, 4 or 5, and produces it. The motion compensation unit 315 supplies block type information 318 indicating which block image has been selected for each block, and motion information 317 associated with the selected block image to the multiplexer 323.

The subtracter 302 computes the difference between the original image 301 of current frame and the predicted image 312 (=316) for each block, and supplies it as a prediction error signal 303. This prediction error signal 303 is transformed into the DCT coefficient by the DCT unit 304, and quantized into the quantized DCT coefficient 306 by the quantizer 305. The quantization parameter used in the quantizer is controlled by the control unit 300, and the control information 322 for quantization is supplied from the control unit 300 to the multiplexer 323. This quantized DCT coefficient 306 is supplied not only to the multiplexer 323 but also to the dequantizer 307. The quantized DCT coefficient 306 fed to the dequantizer 307 is dequantized, and decoded into a prediction error signal 309 by the IDCT unit 308. This prediction error signal 309 is added to the predicted image 312 by the adder 310 and a decoded image 311 of current frame is produced from the adder. This decoded image 311 is stored in the frame memory 313 as the reference image relative to the next frame.

The multiplexer 323 is used to multiplex the input frame type information, control information for quantization, quantized DCT coefficient, motion information, and block type information according to the format shown in FIGS. 7A and 7B, and transmits as the multiplex signal.

FIG. 7A shows the format of the frame data. The frame data is formed of frame header information, frame type information, global motion vector, a plurality of block data, and an end code. FIG. 7B shows the format of each block data within the frame data. The block data is fundamentally formed of block type information, control information for quantization, motion vector for block, and quantized DCT coefficient. In this case, as to the motion vector for block, there are cases: (a) no motion vector, (c), (d) a single motion vector, and (b) two motion vectors, depending upon the block image selected in the method for synthesizing the predicted image shown in FIG. 3, 4 or 5.

When the format of the block data has no motion vector for block as shown in FIG. 7B(a), the GMC block image is selected in the predicted image synthesizing method shown in FIG. 3.

When the format of the block data has the local motion vector and global-local motion vector as motion vectors for block as shown in FIG. 7B(b), the average block image is selected in the predicted image synthesizing method shown in FIG. 4.

When the format of the block data has only local motion vector as the motion vector for block as shown in FIG. 7B(c), the LMC block image is selected in the predicted image synthesizing method shown in FIGS. 3, 4 and 5, and the average block image is selected in the predicted image synthesizing method shown in FIGS. 3 and 5.

When the format of the block data has only the global-local motion vector as the motion vector for block as shown in FIG. 7B(d), the G-LMC block image is selected in the predicted image synthesizing method shown in FIGS. 4 and 5.

According to the present invention, as described above, by only adding a simple averaging arithmetic process, it is possible to increase the number of different block images for producing prediction error relative to the original image and to raise the coding efficiency.

What is claimed is:

1. A method of synthesizing a predicted image relative to an original image of current frame, comprising the steps of:

dividing said original image into a plurality of blocks;

synthesizing a plurality of LMC block images for each block of said original image by local motion compensation;

synthesizing a plurality of G-LMC block images for each block of said original image by global-local motion compensation;

performing, for each block of said original image, an averaging process between said LMC block image and said G-LMC block image synthesized for each block of said original image, and synthesizing a plurality of average block images for each block of said original images;

selecting one block image from said LMC block image, said G-LMC block image and said average block image synthesized for each block of said original image; and synthesizing said predicted image by collecting said block images selected for each block of said original image.

2. A video coding method using motion compensation, comprising the steps of:

dividing an original image of current frame into a plurality of blocks;

synthesizing a plurality of LMC block images relative to each block of said original image by local motion compensation;

synthesizing a plurality of G-LMC block images relative to each block of said original image by global-local motion compensation;

performing an averaging process, for each block of said original image, between said LMC block image and said G-LMC block image synthesized for each block of said original image, and synthesizing a plurality of average block images for each block of said original image;

selecting one block image from said LMC block image, said G-LMC block image and said average block image synthesized for each block of said original image;

computing a prediction error signal between the image within a block of said original image and said selected block image for each block of said original image;

transforming each of said prediction error signals computed for each block of said original image into a DCT coefficient;

quantizing each of said DCT coefficients for each block of said original image to produce quantized DCT coefficients; and transmitting each of said quantized DCT coefficients for each block of said original image.

3. A coding device for performing video coding by use of motion compensation, comprising:

a motion compensation unit which performs motion compensation by use of an original image of a current frame and a reference image, and synthesizes a predicted image;

a subtracter which produces a prediction error signal between said original image and said synthesized predicted image for each of a plurality of blocks into which said original image is divided;

a DCT unit which transforms each of said prediction error signals for each of said blocks into a DCT coefficient; and a quantizer which quantizes each of said DCT coefficients for each of said blocks to produce quantized DCT coefficients, wherein said motion compensation unit synthesizes said LMC block image and said G-LMC block image for each of said blocks by use of said original image and said reference image, said synthesized LMC block image and G-LMC block image are averaged so that an average block image is synthesized for each of said blocks, and wherein any one block image is selected from said synthesized LMC block image, said G-LMC block image and said average block image is selected for each of said blocks, and supplied to said subtracter.

4. A method of synthesizing a predicted image relative to an original image of current frame, comprising the steps of:

dividing said original image into a plurality of blocks;

synthesizing a plurality of LMC block images for each block of said original image by local motion compensation;

synthesizing a plurality of GMC block images and a plurality of G-LMC block images for each block of said original image by global-local motion compensation;

performing, for each block of said original image, an averaging process between said LMC block image and said GMC block image synthesized for each block of said original image, and synthesizing a plurality of average block images for each block of said original image;

selecting one block image from said LMC block image, G-LMC block image and said average block image synthesized for each block of said original image; and synthesizing said predicted image by collecting said block images selected for each block of said original images.

5. A video coding method using motion compensation, comprising the steps of:

dividing an original image of a current frame into a plurality of frames;

synthesizing a plurality of LMC block images relative to each block of said original image by local motion compensation;

synthesizing a plurality of GMC block images and a plurality of G-LMC block images relative to each block of said original image by global-local motion compensation;

performing, for each block of said original image, an averaging process between said LMC block image and said GMC block image synthesized for each block of said original image, and synthesizing a plurality of average block images for each block of said original image;

selecting one block image from said LMC block image, G-LMC block image and said average block image synthesized for each block of said original image;

computing a prediction error signal between the image within a block of said original image and said selected block image for each block of said original image;

transforming each of said prediction error signals computed for each block of said original image into a DCT coefficient;

quantizing each of said DCT coefficients for each block of said original image to produce quantized DCT coefficients; and transmitting each of said quantized DCT coefficients for each block of said original image.

6. A coding device for video coding using motion compensation, comprising:

a motion compensation unit which performs compensation by use of an original image of current frame and a reference image, and synthesizes a predicted image;

a subtracter which provides a prediction error signal between said original image and said synthesized predicted image for each of a plurality of blocks into which said original image is divided;

a DCT unit which transforms each of said prediction error signals for each of said blocks into a DCT coefficient; and a quantizer which quantizes each of said DCT coefficients for each of said blocks to produce quantized DCT coefficients, wherein said motion compensation unit which synthesizes said LMC block image, said GMC block image and said G-LMC block image for each of said blocks by use of said original image and said reference image, and said synthesized LMC block image and said synthesized GMC block image are averaged so that an average block image is synthesized for each of said blocks, and wherein any one block image is selected from said LMC block image, said G-LMC block image and said average block image synthesized for each of said blocks, and supplied to said subtracter.

* * * * *